United States Patent
Lee et al.

(10) Patent No.: US 8,482,860 B2
(45) Date of Patent: Jul. 9, 2013

(54) VARIFOCAL LENS STRUCTURE AND METHOD OF MANUFACTURING THE SAME

(75) Inventors: Seung-wan Lee, Suwon-si (KR); Woon-bae Kim, Seoul (KR); Kyu-dong Jung, Suwon-si (KR); Jeong-yub Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 13/161,651

(22) Filed: Jun. 16, 2011

(65) Prior Publication Data

US 2012/0154924 A1  Jun. 21, 2012

(30) Foreign Application Priority Data

Dec. 16, 2010  (KR) .................. 10-2010-0129310

(51) Int. Cl.
*G02B 1/06* (2006.01)
*G02B 3/12* (2006.01)

(52) U.S. Cl.
USPC .......................................... 359/666; 359/665

(58) Field of Classification Search
USPC ................................ 359/665, 666
See application file for complete search history.

(56) References Cited

U.S. PATENT DOCUMENTS

| 6,188,526 | B1 | 2/2001 | Sasaya et al. |
| 7,440,193 | B2 | 10/2008 | Gunasekaran et al. |
| 2007/0211207 | A1 | 9/2007 | Lo et al. |
| 2010/0118413 | A1 | 5/2010 | Kim et al. |
| 2010/0165475 | A1 | 7/2010 | Lee et al. |
| 2010/0195213 | A1* | 8/2010 | Bolis ............................ 359/666 |

FOREIGN PATENT DOCUMENTS

| EP | 2157455 A1 | 2/2010 |
| JP | 2009-175536 A | 8/2009 |
| JP | 2010-097200 A | 4/2010 |
| KR | 10-2008-0043106 A | 5/2008 |
| KR | 10-2010-0078705 A | 7/2010 |
| WO | 2008100154 A1 | 8/2008 |

OTHER PUBLICATIONS

Communication dated Apr. 5, 2012 issued by the European Patent Office in corresponding European Application No. 11193903.9.

* cited by examiner

*Primary Examiner* — William Choi
(74) *Attorney, Agent, or Firm* — Sughrue Mion, PLLC (57) ABSTRACT

A varifocal lens structure and a method of manufacturing the same, the varifocal lens structure including: a frame having a fluid chamber filled with an optical fluid and formed of polymethylsiloxane (PDMS) containing a predetermined fluid; a transparent cover disposed on a top surface of the frame so as to cover the fluid chamber; a transparent elastic membrane disposed on a bottom surface of the frame so as to form a lower wall of the fluid chamber; and an actuator disposed on the elastic membrane.

20 Claims, 4 Drawing Sheets

VARIFOCAL LENS STRUCTURE AND METHOD OF MANUFACTURING THE SAME

CROSS-REFERENCE TO RELATED APPLICATIONS

This application claims priority from Korean Patent Application No. 10-2010-0129310, filed on Dec. 16, 2010, in the Korean Intellectual Property Office, the contents of which are hereby incorporated by reference in their entirety.

BACKGROUND

1. Field

Apparatuses and methods consistent with exemplary embodiments relate to varifocal lens structures, and more particularly, to varifocal lens structures using an optical fluid and methods of manufacturing the same.

2. Description of the Related Art

Modern portable communication devices have been developed as multipurpose electronic devices including various functions such as a camera function, a game playing function, a music playing function, a broadcasting function, an Internet function, and the like, as well as a simple telephone function and a message-sending function. Furthermore, attempts to integrate more functions in small spaces of portable communication devices have been made. Among modules to be integrated in portable communication devices, a camera module is the most difficult to reduce in size. There is a limit to reducing the size of an imaging optical system in a camera module. An auto-focusing function, a hand tremble-preventing function, a zooming function, and the like are necessary to obtain better image quality. However, it is not easy to add these functions to a camera module due to size limitations. Examples of methods of performing an auto-focusing function in a camera module are a method using a step motor, a method using a voice coil motor (VCM), a method using a liquid lens, and the like. However, the method using a step motor and the method using a voice coil motor are inappropriate for portable communication devices due to size limitations. Additionally, there are many difficulties in manufacturing portable communication devices that use step motor and VCM methods via batch processes, and thus it is not easy to reduce the manufacturing costs thereof.

In order to circumvent these problems, tiny varifocal lens structures have recently been developed that have a small thickness, that adjust a focal length of a lens, and that are manufactured at a wafer level. In a varifocal lens structure, a pressure applied to an optical fluid varies when an actuator is driven, and the pressure variation causes a membrane to deform and thereby varying a focal length of the lens. A varifocal lens structure is generally disposed in front of a camera module and performs an auto-focusing function. In a varifocal lens structure, a profile of a transparent optical fluid acting as a lens is changed, and a focus of the varifocal lens structure is changed. However, an optical fluid has a relatively high thermal expansion coefficient compared to thermal expansion coefficients of adjacent materials. Thus, if the operating temperature of an optical fluid is changed, the shape of the optical fluid is deformed due to a variation of the volume of the optical fluid. Accordingly, development of a varifocal lens structure having a structure capable of compensating for deformation of an optical fluid due to a temperature change is desired.

SUMMARY

One or more exemplary embodiments include varifocal lens structures using an optical fluid and methods of manufacturing the same.

Additional exemplary embodiments will be set forth in part in the description which follows and will be apparent from the description, or may be learned by practice of the presented exemplary embodiments.

According to an exemplary embodiment, a varifocal lens structure including: a frame having a fluid chamber filled with an optical fluid and formed of polymethylsiloxane (PDMS) containing a predetermined fluid; a transparent cover disposed on a top surface of the frame so as to cover the fluid chamber; a transparent elastic membrane disposed on a bottom surface of the frame so as to form a lower wall of the fluid chamber; and an actuator disposed on the elastic membrane.

In exemplary embodiments, the optical fluid and the predetermined fluid may have a higher thermal expansion coefficient than the PDMS. Micro bubbles (i.e. cavities), are formed in the PDMS used to form the frame, and the predetermined fluid is filled into the micro bubbles. A diameter of the micro bubbles may be equal to or less than about 10 µm.

According to exemplary embodiments, each of the optical fluid and the predetermined fluid may be formed of a transparent liquid that does not permeate the PDMS. Each of the optical fluid and the fluid may be formed of a liquid including a fluorine functional group. For example, the transparent liquid including the fluorine functional group may include a perfluoropolyether (PFPE)-based oil.

In exemplary embodiments a concentration of the predetermined fluid in the PDMS may be equal to or more than about 10 wt %.

According to exemplary embodiments, a thickness of the frame may be the same as that of the optical fluid.

In other exemplary embodiments, a thickness of the frame may be larger than that of the optical fluid. In such an exemplary embodiment, the transparent cover may contact a top surface of the optical fluid and the top surface of the frame. The transparent cover may have a lower thermal expansion coefficient than the optical fluid. A transparent film having a lower thermal expansion coefficient than the optical fluid may be disposed on a top surface of the optical fluid, and the transparent cover may contact a top surface of the transparent film and the top surface of the frame.

According to exemplary embodiments, the transparent cover may be formed of glass or polymer. The elastic membrane may be formed of the PDMS. The actuator may include a polymer actuator.

Other exemplary embodiments include methods of manufacturing a varifocal lens structure. The methods of exemplary embodiments include: mixing a predetermined fluid into a polymethylsiloxane (PDMS) solution including a base and a hardener so as to form micro bubbles filled with the predetermined fluid in the PDMS solution; half-hardening the PDMS solution containing the micro bubbles filled with the predetermined fluid and then processing the half-hardened PDMS solution so as to manufacture a frame having a fluid chamber; attaching the frame to a transparent cover; filling the fluid chamber of the frame with an optical fluid; and attaching a transparent elastic membrane to the frame so as to seal the optical fluid.

According to exemplary embodiments, attaching the frame to the transparent cover may include: surface treating the transparent cover; coating the PDMS solution on a surface of the transparent cover and then half-hardening the PDMS solution; coating the PDMS solution on a surface of the frame and then half-hardening the PDMS solution; and attaching the frame to the transparent cover.

In exemplary embodiments, attaching the transparent elastic membrane to the frame may include: surface treating a predetermined film; coating the PDMS solution on one surface of the film and then half-hardening the PDMS solution; attaching the coating on the film to the frame so as to seal the optical fluid; and detaching the film from the half-hardened PDMS solution.

BRIEF DESCRIPTION OF THE DRAWINGS

These and/or other aspects of exemplary embodiments will become apparent and more readily appreciated from the following description of the exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments.

Figure 1A:
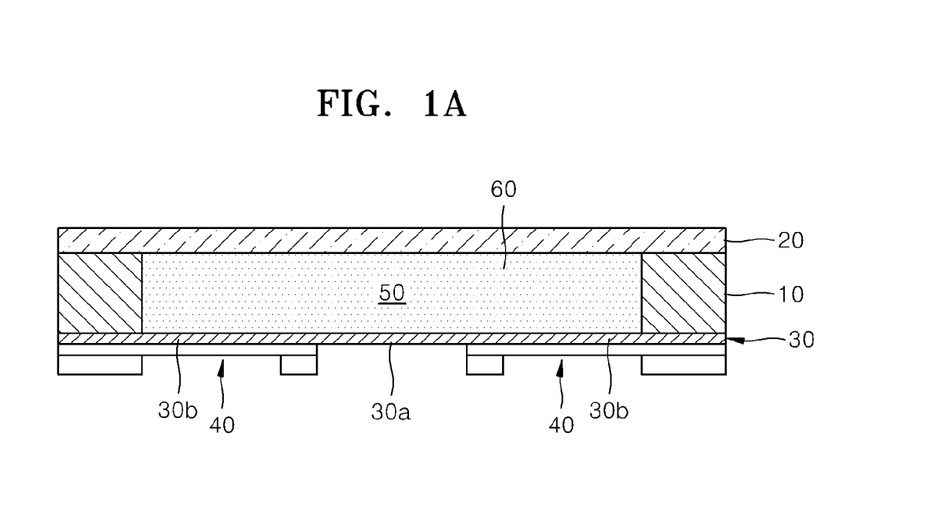
FIGS. 1A through 1C are cross-sectional views of a varifocal lens structure according to the related art.
Figure 1B:
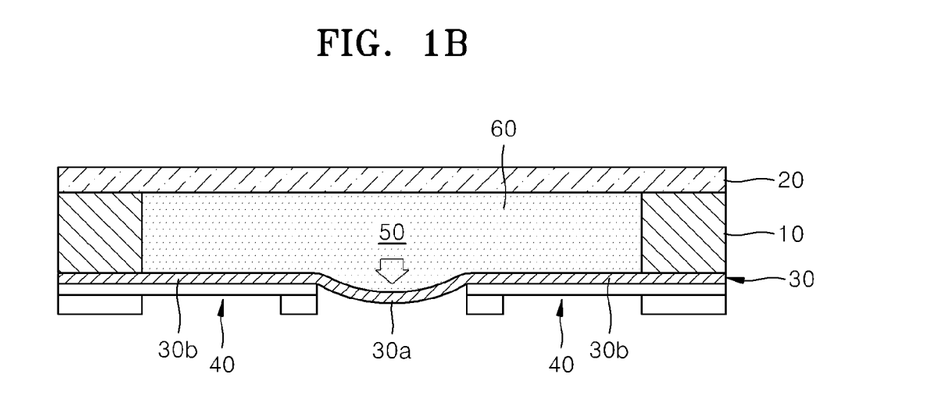
Figure 1C:
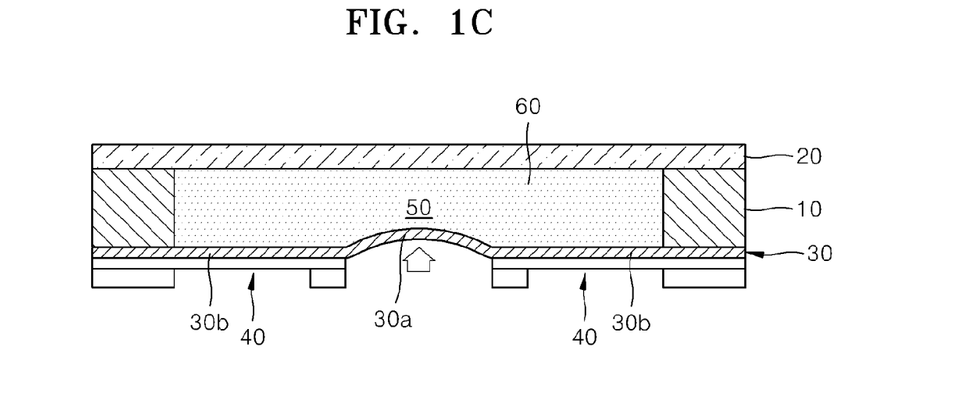

FIGS. 1A through 1C are cross-sectional views of a varifocal lens structure according to the related art. In detail, FIGS. 1A, 1B, and 1C illustrate the varifocal lens structure operating at room temperature, the varifocal lens structure operating at a relatively high temperature, and the varifocal lens structure operating at a relatively low temperature, respectively.

Referring to FIGS. 1A through 1C, a fluid chamber 50 is formed in a frame 10, and an optical fluid 60 is filled into the fluid chamber 50. The fluid 60 may be, for example, a transparent oil or the like. The frame 10 may be formed of silicon, for example. A transparent cover 20 is disposed on a top surface of the frame 10 and forms an upper wall of the fluid chamber 50, and a transparent elastic membrane 30 is disposed on a bottom surface of the frame 10 and forms a lower wall of the fluid chamber 50. An actuator 40 is disposed on a bottom surface of the elastic membrane 30. The elastic membrane 30 includes a driving unit 30b on which the actuator 40 is disposed, and a variable lens unit 30a positioned within the driving unit 30b. In this structure, when the actuator 40 is driven, the driving unit 30b of the elastic membrane 30 is deformed, and pressure is applied to the optical fluid 50. The pressure causes the variable lens unit 30a of the elastic membrane 30 to deform, thereby varying a focal length of a lens.

FIG. 1A illustrates a state where the varifocal lens structure operates at room temperature (for example, about 20° C.). In FIG. 1A, the variable lens unit 30a of the elastic membrane 30 has a flat shape. When the operating temperature of the varifocal lens structure changes from the room temperature to a relatively high temperature, for example, to about 60° C., the variable lens unit 30a of the elastic membrane 30 has a convex shape in a downward direction, as illustrated in FIG. 1B. Also, when the operating temperature of the varifocal lens structure changes from the room temperature to a relatively low temperature, for example, to about −20° C., the variable lens unit 30a of the elastic membrane 30 may have a convex shape in an upward direction. In general, the transparent oil used to form the optical fluid 60 has a relatively high thermal expansion coefficient (volume expansion coefficient) of about 1,000 ppm/° C., whereas silicon used to form the frame 10 has a relatively low thermal expansion coefficient (linear expansion coefficient) of about 2.3 ppm/° C. Accordingly, since the optical fluid 60 has a much higher thermal expansion coefficient than the frame 10, when the operating temperature of the varifocal lens structure varies, the variable lens unit 30a of the elastic membrane 30 is deformed due to expansion or contraction of the optical fluid 60, as illustrated in FIGS. 1B and 1C. In this way, in the varifocal lens structure, the optical fluid 60 expands or contracts according to a change of the operating temperature. Thus, the refractive power of the optical fluid 60 is not uniform, but changes with operating temperature.

Figure 2:
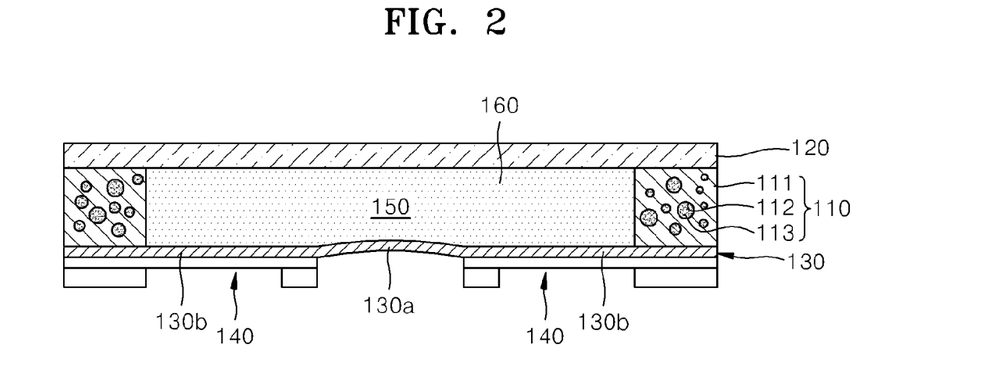
FIG. 2 is a cross-sectional view of a varifocal lens structure according to an exemplary embodiment.

FIG. 2 is a cross-sectional view of a varifocal lens structure according to an exemplary embodiment. Referring to FIG. 2, the varifocal lens structure according to the current exemplary embodiment includes: a frame 110 in which a fluid chamber 150 is formed; a transparent cover 120 disposed on a top surface of the frame 110; a transparent elastic membrane 130 disposed on a bottom surface of the frame 110; and an actuator 140 disposed on the elastic membrane 130. The fluid chamber 150 of the frame 110 is filled with an optical fluid 160. The optical fluid 160 may be a transparent fluid that does not permeate polymethylsiloxane (PDMS). Specifically, the optical fluid 160 may include a transparent oil including a fluorine functional group. For example, the optical fluid 160 may be a prefluoropolyether (PFPE)-based oil. However, this is illustrative of an exemplary embodiment, but exemplary embodiments are not limited thereto.

The frame 110 may be formed of PDMS 111 containing a predetermined fluid 113. In this regard, a thickness of the frame 110 may be the same as that of the fluid chamber 150, i.e., that of the optical fluid 160. Micro bubbles 112 are formed in the PDMS 111 used to form the frame 110, and the micro bubbles 112 are filled with the predetermined fluid 113. In other words, the predetermined fluid is encapsulated within the frame. In exemplary embodiments, the micro bubbles 112 may have a diameter equal to or less than about 10 μm. However, exemplary embodiments are not limited thereto. The predetermined fluid 113 filling the micro bubbles 112 may be a transparent liquid that does not permeate the PDMS 111, like the optical fluid 160 described above. Specifically, the optical fluid 160 may include the transparent oil including the fluorine functional group. For example, the optical fluid 160 may be a PFPE-based oil. However, this is illustrative of an exemplary embodiment, and exemplary embodiments not limited thereto. The predetermined fluid 113 filling the micro bubbles 112 and the optical fluid 160 may be formed of the same liquid. Alternatively, the predetermined fluid 113 and the optical fluid 160 may be formed of different liquids.

The transparent cover 120 is disposed on the top surface of the frame 110 and forms an upper wall of the fluid chamber 150. In this exemplary embodiment, the transparent cover 120 contacts a top surface of the optical fluid 160 and the top surface of the frame 110. Since the optical fluid 160 and the frame 110 have the same thickness, the transparent cover 120 may be shaped as a plate having a predetermined thickness. The transparent cover 120 may be formed of glass or polymer having a relatively low thermal expansion coefficient, for example. The transparent cover 120 may have a thickness at which the transparent cover 120 is not deformed even due to driving of the actuator 140, for example, a thickness equal to or greater than about 50 μm. However, exemplary embodiments are not limited thereto.

The transparent elastic membrane 130 is disposed on the bottom surface of the frame 110 and forms a lower wall of the fluid chamber 150, and the actuator 140 is disposed on a bottom surface of the elastic membrane 130. The elastic membrane 130 includes a driving unit 130b on which the actuator 140 is disposed, and a variable lens unit 130a positioned within the driving unit 130b. The elastic membrane 130 may be formed of polymer, for example, PDMS. The actuator 140 may be a polymer actuator having a relatively small thickness and relatively low power consumption. However, exemplary embodiments are not limited thereto, and various types of actuators may be used. In the above-described structure, when the actuator 140 is driven, the driving unit 130b of the elastic membrane 130 is deformed, and pressure is applied to the optical fluid 160. The pressure applied to the optical fluid 160 deforms the variable lens unit 130a of the elastic membrane 130a, thereby varying a focal length of a lens.

In the current exemplary embodiment, the thickness of the frame 110 varies according to displacement of the optical fluid 160 caused by a change of the operating temperature of the varifocal lens structure. In this way, when the displacement of the optical fluid 160 caused by a change of the operating temperature is similar to the displacement of the frame 110, the refractive power of the lens may be prevented from changing according to a temperature change. Specifically, the optical fluid 160 may be formed of a PFPE-based oil having a relatively high thermal expansion coefficient (volume expansion coefficient) of about 1,000 ppm/° C. The frame 110 may be formed of PDMS having a thermal expansion coefficient (linear expansion coefficient) between about 200 ppm/° C. and about 230 ppm/° C., which is three to four times higher than a thermal expansion coefficient of general polymer, which is about 60 ppm/° C., but is lower than the thermal expansion coefficient of the PFPE-based oil used to form the optical fluid 160. Thus, when the frame 110 is formed of PDMS, due to the relatively high thermal expansion coefficient of the optical fluid 160, the displacement of the frame 110 caused by a change of the operating temperature is smaller than the displacement of the optical fluid 160 caused by the same change of the operating temperature. Thus, in the current exemplary embodiment, the frame 110 is formed of the PDMS 111 containing the predetermined fluid 113. The predetermined fluid 113 may have a relatively high thermal expansion coefficient, for example, the thermal expansion coefficient of the optical fluid 160, so that the thickness of the frame 110 may vary according to the displacement of the optical fluid 160 caused by a change in the operating temperature. The transparent oil that includes the fluorine functional group, which is an oil that does not permeate the PDMS 111, for example, the PFPE-based oil, is used to form the predetermined fluid 113 and then the micro bubbles 112 formed in the PDMS 111 may be filled with the predetermined fluid. In such an exemplary embodiment, the concentration of the predetermined fluid 113 in the PDMS 111 may be about 10 wt %, for example. However, exemplary embodiments are not limited thereto. Accordingly, in the current exemplary embodiment, when the frame 110 is manufactured of the PDMS 111 containing the predetermined fluid 113 having a relatively high thermal expansion coefficient and the concentration of the predetermined fluid 113 contained in PDMS 111 is controlled, the optical fluid 160 and the frame 110, which have the same thickness, may have similar displacements in response to a change in the operating temperature.

Figure 4:
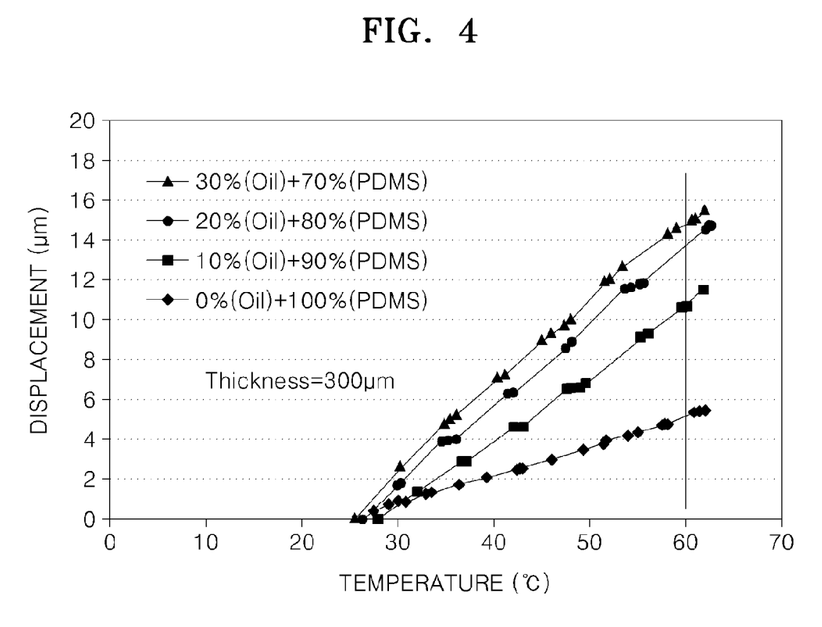
FIG. 4 is a graph showing displacement versus temperature with respect to polymethylsiloxane (PDMS) including a prefluoropolyether (PFPE)-based oil.

FIG. 4 is a graph showing displacement versus temperature with respect to PDMS including a PFPE-based oil. Accordingly, a case where the PFPE-based oil having a thermal expansion coefficient (volume expansion coefficient) of about 1,050 ppm/° C. is used to form an optical fluid will now be described.

Referring to FIG. 4, when a thickness of an optical fluid is about 300 μm and an operating temperature changes from about 20° C. to about 60° C., displacement of the optical fluid is about 12.6 μm. Thus, displacement of a frame also having a thickness of about 300 μm corresponding to the displacement of the optical fluid is necessary so as to prevent a change in the refractive power of the lens caused by the change in the operating temperature. If the frame is formed of PDMS, when the operating temperature changes from about 20° C. to about 60° C., the displacement of the frame is about 5 μm, and the displacement of the frame may not compensate for the displacement of the optical fluid caused by the change in the operating temperature. As illustrated in FIG. 4, if the frame is formed of PDMS containing a PFPE-based oil and a concentration of the PFPE-based oil in the PDMS is about 10 wt % to about 20 wt %, when the operating temperature changes from about 20° C. to about 60° C., the displacement of the frame is about 11 μm to 13 μm, and the displacement of the frame may compensate for the displacement of the optical fluid caused by the change in the operating temperature.

Figure 3:
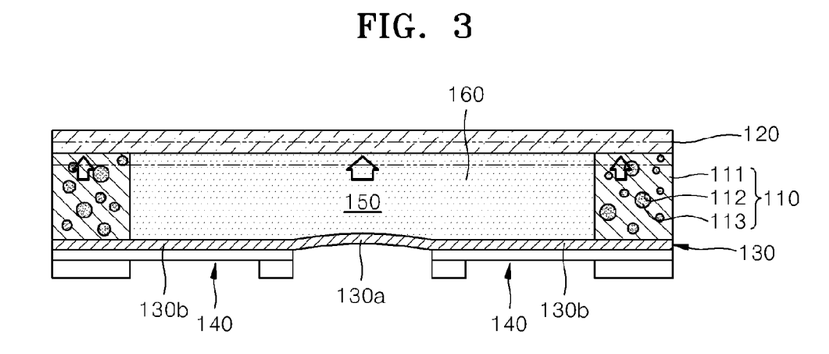
FIG. 3 is a cross-sectional view of the varifocal lens structure of FIG. 2 operating at a high temperature.

FIG. 2 illustrates a varifocal lens structure operating at room temperature (for example, about 20° C.), and FIG. 3 illustrates a varifocal lens structure operating at a relatively high temperature (for example, about 60° C.). Referring to FIGS. 2 and 3, as the operating temperature changes from the room temperature to the relatively high temperature, the thickness of the optical fluid 160 and the thickness of the frame 110 are similarly increased. Thus, even when the operating temperature changes, the refractive power of the lens may be uniform.

Figure 5:
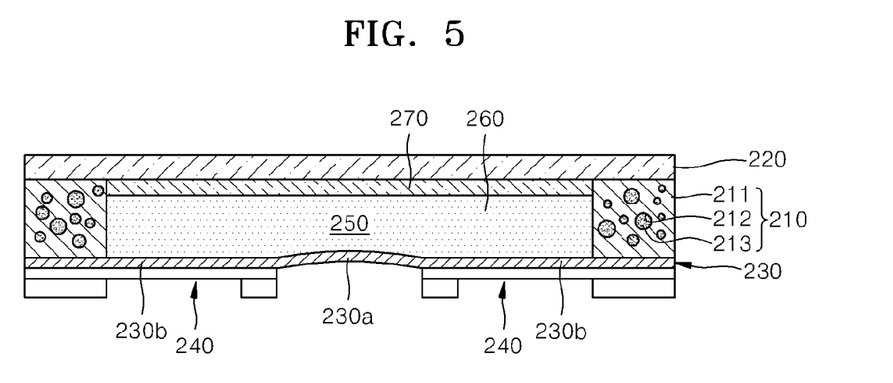
FIG. 5 is a cross-sectional view of a varifocal lens structure according to another exemplary embodiment.

FIG. 5 is a cross-sectional view of a varifocal lens structure according to another exemplary embodiment. Hereinafter, a difference between FIG. 2 and FIG. 5 will be described.

Referring to FIG. 5, a fluid chamber 250 is formed in a frame 210 formed of PDMS 211 containing a predetermined fluid 213, and an optical fluid 260 is filled into the fluid chamber 250. In this regard, a thickness of the frame 210 may be larger than that of the fluid chamber 250, i.e., that of the optical fluid 260. A transparent liquid that does not permeate the PDMS 211 may be used to form the optical fluid 260, as described above. In detail, the optical fluid 260 may include a transparent oil including a fluorine functional group. For example, a PFPE-based oil may be used to form the optical fluid 260. However, this is illustrative of exemplary embodiments, and exemplary embodiments are not limited thereto.

The frame 210 may be formed of the PDMS 211 containing the predetermined fluid 213. Micro bubbles 212 are formed in the PDMS 211, and the micro bubbles 212 are filled with the predetermined fluid 213. Accordingly to exemplary embodiments, the micro bubbles 212 may have a diameter equal to or less than about 10 μm. However, exemplary embodiments are not limited thereto. The predetermined fluid 213 filling the micro bubbles 212 may be a transparent liquid that does not permeate PDMS 211, like the above-described optical fluid 260. More specifically, the predetermined fluid 213 may be the transparent oil including the fluorine functional group.

The predetermined fluid 213 filling the micro bubbles 212 and the optical fluid 260 may be the same liquid or different liquids.

A transparent film 270 having a lower thermal expansion coefficient than the optical fluid 260 may be disposed on a top surface of the optical fluid 260. In such an exemplary embodiment, the transparent film 270 may have a thickness that corresponds to a thickness difference between those of the frame 210 and the optical fluid 260. The thicknesses of the optical fluid 260, the transparent film 270, and the frame 210 may be determined based on the thermal expansion coefficient of the optical fluid 260, the thermal expansion coefficient of the transparent film 270, and a thermal expansion coefficient of the frame 210 (i.e., a thermal expansion coefficient and a concentration of the predetermined fluid 213 filled into the frame 210). Accordingly, the thickness of the frame 210 may be reduced by reducing the thickness of the optical fluid 260 having a relatively high thermal expansion coefficient. The amount of the optical fluid 260 may also be reduced and thus, manufacturing costs of the varifocal lens structure may be reduced.

A transparent cover 220 is disposed on a top surface of the frame 210. Accordingly, the transparent cover 220 contacts a top surface of the transparent film 270 and the top surface of the frame 210. Because the sum of the thicknesses of the optical fluid 260 and the transparent film 270 is the same as the thickness of the frame 210, the transparent cover 220 may be shaped as a plate having a predetermined thickness. The transparent cover 220 may be formed of glass or polymer having a relatively low thermal expansion coefficient, for example.

A transparent elastic membrane 230 is disposed on a bottom surface of the frame 210 and forms a lower wall of the fluid chamber 250. An actuator 240 is disposed on a bottom surface of the elastic membrane 230. The elastic membrane 230 includes a driving unit 230b on which the actuator 240 is disposed, and a variable lens unit 230a positioned within the driving unit 230b. The elastic membrane 230 may be formed of polymer, for example, PDMS. The actuator 240 may be a polymer actuator having a relatively small thickness and relatively low power consumption.

Figure 6:
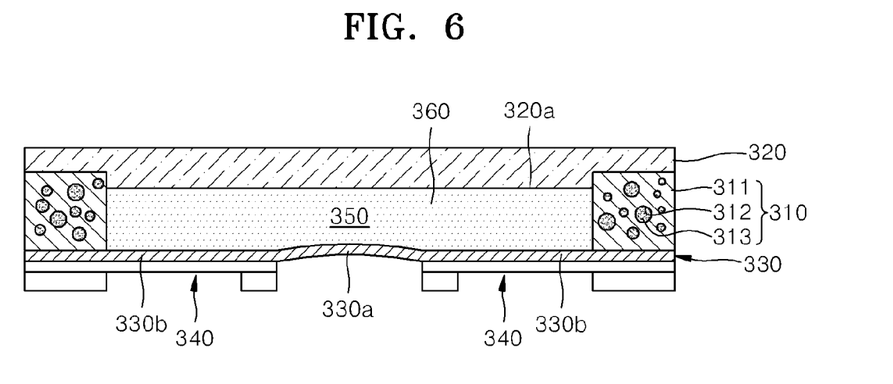
FIG. 6 is a cross-sectional view of a varifocal lens structure according to another exemplary embodiment.

FIG. 6 is a cross-sectional view of a varifocal lens structure according to another exemplary embodiment. Hereinafter, a difference between FIG. 2 and FIG. 6 will be described.

Referring to FIG. 6, a fluid chamber 350 is formed in a frame 310 formed of PDMS 311 containing a predetermined fluid 313, and an optical fluid 360 is filled into the fluid chamber 350. According to this exemplary embodiment, a thickness of the frame 310 may be larger than that of the fluid chamber 350, i.e., that of the optical fluid 360. The optical fluid 360 may be a transparent liquid that does not permeate the PDMS 311, as described above. In detail, the optical fluid 360 may include a transparent oil that includes a fluorine functional group. For example, the optical fluid 360 may be a PFPE-based oil. However, this is illustrative of exemplary embodiments, but exemplary embodiments are not limited thereto.

The frame 310 may be formed of the PDMS 311 containing the predetermined fluid 313. Micro bubbles 312 are formed in the PDMS 311 used to form the frame 310, and the micro bubbles 312 are filled with the predetermined fluid 313. According to exemplary embodiments, the micro bubbles 312 may have a diameter equal to or less than about 10 μm. However, exemplary embodiments are not limited thereto. The predetermined fluid 313 filling the micro bubbles 312 may be a transparent fluid that does not permeate the PDMS 311, like the optical fluid 360. More specifically, the predetermined fluid 313 may be the transparent oil that includes the fluorine functional group. The predetermined fluid 313 filing the micro bubbles 312 and the optical fluid 360 may be formed of the same liquid or different liquids.

A transparent cover 320 may be disposed on a top surface of the frame 310. Accordingly, the transparent cover 320 may contact a top surface of the optical fluid 360 and the top surface of the frame 310. Thus, the transparent cover 320 may include a protrusion 320a that contacts the top surface of the optical fluid 360. The transparent cover 320 may be manufactured using a material having a lower thermal expansion coefficient than the optical fluid 360. For example, the transparent cover 320 may be formed of glass or polymer having a relatively low thermal expansion coefficient. The transparent cover 320 including the protrusion 320a may be formed by processing flat glass or polymer by using wet etching or the like.

In the current exemplary embodiment, the protrusion 320a of the transparent cover 320 may have a thickness that corresponds to a thickness difference between those of the frame 310 and the optical fluid 360. Accordingly, the thicknesses of the optical fluid 360, the protrusion 320a of the transparent cover 320, and the frame 310 may be determined based on the thermal expansion coefficient of the optical fluid 360, the thermal expansion coefficient of the transparent cover 320, and a thermal expansion coefficient of the frame 310 (i.e., a thermal expansion coefficient and a concentration of the predetermined fluid 313 filled into the frame 310). Accordingly, in the current exemplary embodiment, by reducing the thickness of the optical fluid 360, the thickness of the frame 310 may be reduced, and the amount of the optical fluid 360 may also be reduced.

A transparent elastic membrane 330 is disposed on a bottom surface of the frame 310 and forms a lower wall of the fluid chamber 350. An actuator 340 is disposed on a bottom surface of the elastic membrane 330. The elastic membrane 330 includes a driving unit 330b on which the actuator 340 is disposed, and a variable lens unit 330a positioned within the driving unit 330b. The elastic membrane 330 may be formed of polymer, for example, PDMS. For example, the actuator 340 may be a polymer actuator having a relatively small thickness and relatively low power consumption.

Hereinafter, a method of manufacturing one of the above-described varifocal lens structure according to exemplary embodiments will be described.

First, a PDMS solution in which a base and a hardener are mixed at a predetermined ratio, is prepared. For example, the base and the hardener may be mixed in the PDMS solution at a ratio of 10:1. A predetermined fluid is mixed in the PDMS solution. In this regard, the predetermined fluid to be mixed in the PDMS solution may be a transparent liquid that has a higher thermal expansion coefficient than the PDMS and does not permeate the PDMS. In detail, the predetermined fluid may be a transparent oil including a fluorine functional group, for example, a PFPE-based oil. A concentration of the oil contained in the PDMS solution may be equal to or more than about 10 wt %, for example. However, exemplary embodiments are not limited thereto. Accordingly, when a predetermined oil is to be mixed in the PDMS solution, micro bubbles to be filled with the oil may be formed in the PDMS solution. According to the exemplary embodiments, the micro bubbles may have a diameter that equals to or is less than about 10 μm. However, exemplary embodiments are not limited thereto.

Subsequently, the PDMS solution containing the micro bubbles filled with the oil is half-hardened in the form of a film having a predetermined thickness (for example, about 150 μm to about 300 μm) at a predetermined temperature (for example, at a temperature equal to or greater than about 60° C.) and then is processed so as to manufacture a frame having a fluid chamber.

Next, the frame is attached to a transparent cover formed of glass or polymer. Specifically, after the transparent cover is prepared, the transparent cover is surface treated (for example, plasma surface treated). The surface treatment is performed so that the PDMS solution may be well coated on the surface of the transparent cover. The PDMS solution is coated on a surface of the transparent cover at a predetermined thickness (for example, about 10 µm to about 50 µm) and then the coating is half-hardened. Subsequently, the PDMS solution is coated on a surface of the frame and then this coating is half-hardened. Thus, the oil contained in the frame is confined in the frame due to the half-hardened PDMS solution formed at an outer wall of the frame. The frame is attached to the transparent cover via the half-hardened PDMS solutions.

Subsequently, an optical fluid is filled into the fluid chamber of the frame. The optical fluid may be a transparent liquid that does not permeate the PDMS, as described above. Specifically, the optical fluid may be the transparent oil including the fluorine functional group, for example, the PFPE-based oil.

Next, a transparent elastic membrane is attached to the frame so as to seal the optical fluid. Specifically, a predetermined film, for example, a general polymer film, is surface treated (for example, fluorine treated), and a PDMS solution is coated on a surface of the fluorine-treated polymer film and then the coating is half-hardened. Subsequently, the polymer film on which the half-hardened PDMS solution is coated is attached to the frame so as to cover the optical fluid at a normal pressure or in a vacuum state and then is detached from the half-hardened PDMS solution. The half-hardened PDMS solution forms an the elastic membrane on the frame. Subsequently, an actuator is disposed on the elastic membrane, thereby manufacturing a varifocal lens structure.

In a varifocal lens structure according to the above exemplary a frame having a fluid chamber filled with an optical fluid is manufactured of polymethylsiloxane (PDMS) containing a fluid having a relatively high thermal expansion coefficient so that a thickness of the frame may vary according to displacement of the optical fluid caused by a temperature change. Thus, a refractive power of a varifocal lens may be prevented from being changed according to a change in the operating temperature. The frame is manufactured using PDMS so that manufacturing costs of the varifocal lens structure may be reduced and high-temperature reliability may be improved.

While the exemplary embodiments have been shown and described, it will be understood by those skilled in the art that various changes in form and details may be made thereto without departing from the spirit and scope of the inventive concept as defined by the appended claims.

In addition, many modifications can be made to adapt a particular situation or material to the teachings of this disclosure without departing from the essential scope thereof. Therefore, it is intended that the inventive concept not be limited to the particular exemplary embodiments disclosed, but that the inventive concept will include all embodiments falling within the scope of the appended claims.

What is claimed is:

1. A varifocal lens structure comprising:
    a frame formed of polymethylsiloxane (PDMS) material, comprising a fluid chamber filled with an optical fluid, the PDMS material containing a predetermined fluid;
    a transparent cover disposed on a top surface of the frame to cover the fluid chamber;
    a transparent elastic membrane disposed on a bottom surface of the frame to form a lower wall of the fluid chamber; and
    an actuator disposed on the transparent elastic membrane.

2. The varifocal lens structure of claim 1, wherein a thermal expansion coefficient of the optical fluid is greater than a thermal expansion coefficient of PDMS, and a thermal expansion coefficient of the predetermined fluid is greater than the thermal expansion coefficient of PDMS.

3. The varifocal lens structure of claim 2, wherein micro bubbles are formed in the PDMS material used to form the frame, and the micro bubbles are filled with the predetermined fluid.

4. The varifocal lens structure of claim 3, wherein diameters of the micro bubbles are less than or equal to about 10 µm.

5. The varifocal lens structure of claim 3, wherein the optical fluid and the predetermined fluid are formed of a transparent liquid that does not permeate through the PDMS material.

6. The varifocal lens structure of claim 5, wherein the transparent liquid comprises a fluorine functional group.

7. The varifocal lens structure of claim 6, wherein the transparent liquid comprising the fluorine functional group comprises a perfluoropolyether (PFPE)-based oil.

8. The varifocal lens structure of claim 2, wherein a concentration of the predetermined fluid in the PDMS material is greater than or equal to about 10 wt %.

9. The varifocal lens structure of claim 2, wherein a thickness of the frame is substantially equal to a depth of the optical fluid.

10. The varifocal lens structure of claim 2, wherein a thickness of the frame is greater than a depth of the optical fluid.

11. The varifocal lens structure of claim 10, wherein the transparent cover contacts a top surface of the optical fluid and the top surface of the frame.

12. The varifocal lens structure of claim 10, wherein a thermal expansion coefficient of the transparent cover is less than the thermal expansion coefficient of the optical fluid.

13. The varifocal lens structure of claim 10, further comprising a transparent film is disposed on a top surface of the optical fluid,
    wherein the transparent cover is in contact with a top surface of the transparent film and the top surface of the frame, and
    wherein a thermal expansion coefficient of the transparent film is lower than the coefficient of thermal expansion of the optical fluid.

14. The varifocal lens structure of claim 1, wherein the transparent cover comprises glass or polymer.

15. The varifocal lens structure of claim 1, wherein the elastic membrane comprises PDMS.

16. The varifocal lens structure of claim 1, wherein the actuator comprises a polymer actuator.

17. A varifocal lens structure comprising:
    a frame comprising a fluid chamber filled with an optical fluid;
    a transparent cover disposed on a first surface of the frame which covers the fluid chamber;
    a transparent elastic membrane disposed on a second surface of the frame opposing the first surface; and
    an actuator disposed on the elastic membrane;
    wherein the frame encapsulates a predetermined fluid, wherein a thermal expansion coefficient of the predetermined fluid is greater than a thermal expansion coefficient of a material used to form the frame.

18. The varifocal lens structure of claim 17, wherein a thermal expansion coefficient of the optical fluid is greater than the thermal expansion coefficient of the material.

19. The varifocal lens structure of claim 17, wherein the predetermined fluid is encapsulated in cavities formed in the frame.

20. The varifocal lens structure of claim 17, wherein the frame comprises PDMS.

\* \* \* \* \*